E. H. BRISTOL.
BELT FASTENER.
APPLICATION FILED JAN. 13, 1908.
1,146,472.
Patented July 13, 1915.
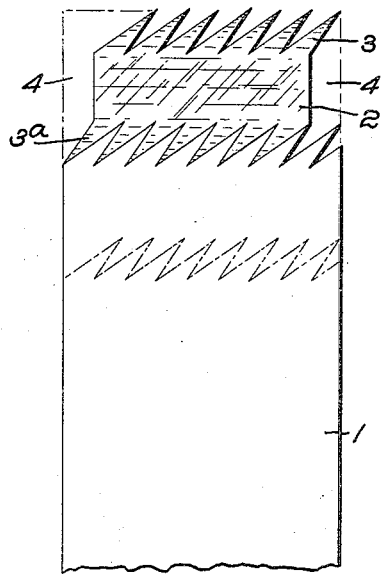
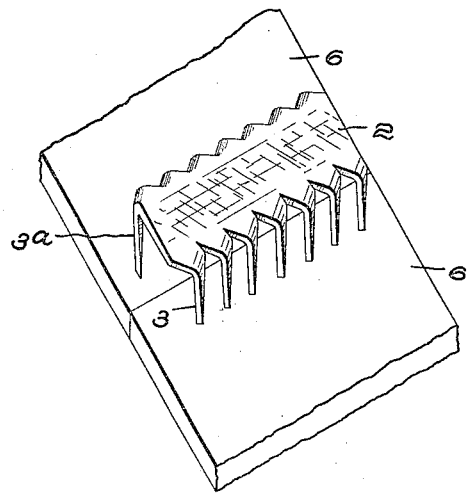
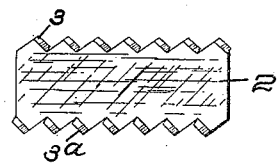
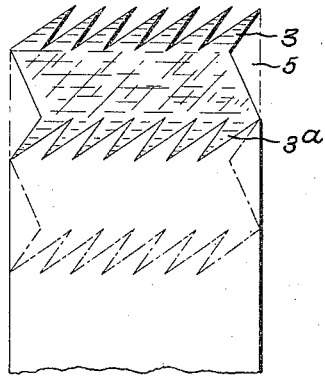
Witnesses:
Edward W. Baker.
Horace A. Crossman.
Inventor:
Edgar H. Bristol,
by Emery & Booth
Attys.

UNITED STATES PATENT OFFICE.

EDGAR H. BRISTOL, OF NAUGATUCK, CONNECTICUT, ASSIGNOR, BY MESNE ASSIGNMENTS, TO THE FOXBORO COMPANY, OF FOXBORO, MASSACHUSETTS, A CORPORATION OF MASSACHUSETTS.

BELT-FASTENER.

1,146,472.  Specification of Letters Patent.  Patented July 13, 1915.

Application filed January 13, 1908. Serial No. 410,503.

*To all whom it may concern:*

Be it known that I, EDGAR H. BRISTOL, a citizen of the United States, residing at Naugatuck, in the county of New Haven and State of Connecticut, have invented certain new and useful Improvements in Belt-Fasteners, of which the following is a specification, reference being had therein to the accompanying drawings.

My invention relates to belt fasteners and the like.

My invention may be readily understood by reference to the following description of an illustrative embodiment thereof shown in the accompanying drawing wherein:

Figure 1 is a perspective view of the belt fastener embodying my invention positioned ready to be forced into the ends of a belt; Fig. 2 is a view illustrating a step in the manufacture of the fastener; Fig. 3 is a plan view of the fastener; and Fig. 4 is a view illustrating a step in the manufacture of a modified form of fastener.

Fasteners embodying my invention may be conveniently made with very little waste of stock by selecting a strip of metal or other material 1 of sufficient width to conform to the desired width of fastener. A series of zig-zag incisions is then made transversely to the length of the strip forming a set of spurs 3 having axes oblique to the edges of said strip. A second similar series of zig-zag incisions is then made at a short distance from said first series forming a second set of spurs 3ª which also are oblique to the edges of said strip but extend in an opposite direction from the spurs of the first series. The second zig-zag series of incisions also form the spurs on one side of the next adjacent fastener in the strip and by the same operation severs the fastener at the end of the strip. In Fig. 2 is shown in full lines a fastener completely incised from the strip 1 the only waste material being the end portions 4. The next cut to be made is indicated in said figure by broken lines which are spaced from the last incisions a sufficient distance to leave a substantial body portion 2.

In the modifications shown in Fig. 4 the ends of the fastener are oblique to the edge of the strip 1 and the triangular portions 5 only are wasted. The spurs of the blank fastener thus formed are then bent on lines transverse to the axial lines of the spurs so that when bent the inner edges of opposed spurs will be perpendicular to the plane of the body 2. As a result when the fastener is applied to a belt the pull receiving edges of the spurs will be perpendicular to the plane of the belt and will securely hold the fastener in place without danger of its working out. The opposite edges of each spur are of unequal length thereby furnishing a substantial extent of material at the base of each spur furnishing a strong union therewith and reducing the liability of the spurs shearing off of the body 2 to a minimum. Because of the oblique relation of each spur with respect to the longitudinal axis of the body 2 when the spur is bent its faces will be oblique to said axis thereby presenting its greatest cross-sectional dimension and plane of greater strength toward the line of pull on the belt. The corresponding faces of all of the spurs are substantially parallel. Each spur on one side of said body joins the latter directly opposite its corresponding spur on the opposite side of said body but when the spurs are bent on lines transverse to their axes the opposite sets of spurs are brought into staggered relation.

In use the ends of the belt are brought together, the fastener placed centrally over the union thus formed, as shown in Fig. 1, the spurs are forced through the belt and bent over or clenched in desired manner.

By my invention is provided a fastener which is economical to manufacture, simple in construction, strong, readily applied and which securely retains the ends fastened.

It will be understood that my invention is not limited to the specific embodiment shown herein but that various modifications may be made without departing from the spirit of my invention.

Claims:

1. A belt fastener comprising a body; spurs on one side of the body bent on axes oblique to the length of the body; and spurs upon the other side of the body bent on axes substantially parallel to those of the first mentioned spurs, the spurs on one side of the body being positioned substantially opposite intervals between and bent parallel to adjacent spurs on the other side of the body.

2. A belt fastener comprising a body and spurs projecting from the opposite sides thereof, each spur on one side of said body joining the latter directly opposite to its corresponding spur on the opposite side of said body, the spurs on one side of the latter being bent into staggered relationship with the spurs on the opposite side of said body.

In testimony whereof I affix my signature in presence of two witnesses.

EDGAR H. BRISTOL.

Witnesses:
BENNET B. BRISTOL,
WILLIAM SCHULZ.

Copies of this patent may be obtained for five cents each, by addressing the "Commissioner of Patents, Washington, D. C."